(12) United States Patent
Inoue et al.

(10) Patent No.: US 6,359,722 B1
(45) Date of Patent: Mar. 19, 2002

(54) OPTICAL ISOLATOR WITH A COMPACT DIMENSION

(75) Inventors: Mitsuteru Inoue, Okazaki; Toshitaka Fujii, Toyohashi; Akio Takayama, Iwata-gun; Atsushi Kitamura, Iwata-gun; Shigeyuki Adachi, Iwata-gun; Hideki Kato, Iwata-gun, all of (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/693,819

(22) Filed: Oct. 23, 2000

(30) Foreign Application Priority Data

Oct. 27, 1999 (JP) ............................................. 11-305961

(51) Int. Cl.$^7$ .............................. G02F 1/09; G02B 5/30
(52) U.S. Cl. .................. 359/281; 359/282; 359/484; 359/490; 359/492; 359/500
(58) Field of Search ................................. 359/484, 486, 359/490, 492, 500, 501, 280, 281, 282; 372/703

(56) References Cited

U.S. PATENT DOCUMENTS

| | | | | |
|---|---|---|---|---|
| 3,439,973 A | * | 4/1969 | Paul et al. ................... | 359/486 |
| 3,653,741 A | * | 4/1972 | Marks ......................... | 359/486 |
| 5,267,077 A | * | 11/1993 | Blonder ...................... | 359/484 |
| 5,305,143 A | * | 4/1994 | Taga et al. .................. | 359/488 |
| 5,365,054 A | * | 11/1994 | Fathauer et al. | |
| 5,401,587 A | * | 3/1995 | Motohiro et al. ............ | 359/492 |
| 5,402,260 A | * | 3/1995 | Tsuneda et al. ............. | 359/484 |
| 5,565,131 A | * | 10/1996 | Shirai et al. | |
| 5,757,538 A | * | 5/1998 | Siroki ......................... | 359/484 |
| 5,864,427 A | * | 1/1999 | Fukano et al. .............. | 359/492 |
| 5,917,643 A | * | 6/1999 | Watanabe et al. ........... | 359/484 |
| 5,999,315 A | * | 12/1999 | Fukano et al. .............. | 359/484 |

FOREIGN PATENT DOCUMENTS

| | | | | |
|---|---|---|---|---|
| EP | 0-785-456 A1 | | 7/1997 | |
| JP | 0132925 | * | 6/1986 | ................. 359/484 |
| JP | A-61-279806 | | 12/1986 | |
| JP | 403171028 | * | 7/1991 | ................. 359/484 |
| JP | 403204613 | * | 9/1991 | ................. 359/484 |
| JP | A-5-45608 | | 2/1993 | |
| JP | A-6-75189 | | 3/1994 | |
| JP | 407056018 | * | 3/1995 | ................. 359/492 |
| JP | 9-43429 | * | 2/1997 | ................. 359/492 |
| JP | 11183846 | * | 7/1999 | ................. 359/484 |
| JP | 11-283511 | | 10/1999 | |

\* cited by examiner

Primary Examiner—Ricky D. Shafer
(74) Attorney, Agent, or Firm—Oliff & Berridge, PLC

(57) ABSTRACT

The present invention provides a compact optical isolator. A polarizer 2A and/or an analyzer 2B of an optical isolator 1 are/is formed of a cobalt magnetic substance minute particle cluster thin film 2. The cobalt magnetic substance minute particle cluster thin film 2 can be formed in the form of tape, film or sheet, whereby the thickness of the polarizer 2A and/or the analyzer 2B can be made small and in addition thereto, the polarizer and/or the analyzer can be formed integrally with a magneto-optical member which is formed in the form of thin film. More compact dimension and lighter weight can be realized as compared with the prior art in which Rochon prism made of calcite, rutile single crystal having wedge form or polarizing beam splitter is employed as the polarizer and the analyzer.

4 Claims, 18 Drawing Sheets

(a) $C_\infty = 9.1\%$ (b) $C_\infty = 33.3\%$ (c) $C_\infty = 75.0\%$ (a) $H_d = 0 kA/cm$ (b) $H_d = 0.16 kA/cm$ (c)$H_d$ = 2.40kA/cm $H_d = 0kA/cm$ $H_d = 2.40kA/cm$

θ : ANGLE FROM CLUSTER DIRECTION
OF IN-PLANE ORIENTATION FILM

ONE EXAMPLE OF MAGNETO-OPTICAL MULTILAYER FILM
WHICH IS USED FOR MAGNETO-OPTICAL MEMBER SHOWN IN FIG.1

N : 8
bN : 10100011
NM : 4

REFLECTIVITY AND MAGNETO-OPTICAL EFFECT
TO MAGNETIC SUBSTANCE FILLING RATE
ON MAGNETO-OPTICAL MULTILAYER FILM SHOWN IN FIG. 9

MAGNETIC SUBSTANCE FILLING RATE  PM (NM·dM/D)

MAGNETIC SUBSTANCE FILLING RATE  PM (NM·dM/D)

——— FARADAY ROTATION ANGLE $\theta_F$

- - - - - - TOTAL ROTATION ANGLE $\theta$

RELATION BETWEEN MAGNETIC SUBSTANCE FILLING RATE
AND MAGNETO-OPTICAL EFFECT
ON MAGNETO-OPTICAL MULTILAYER FILM WHICH DOES NOT SATISFY
NONREFLECTIVE CONDITIONS

MAGNETIC SUBSTANCE FILLING RATE   PM (NM·dM/D)

——— FARADAY ROTATION ANGLE $\theta_F$

------- TOTAL ROTATION ANGLE $\theta$

RELATION BETWEEN MAGNETIC SUBSTANCE FILLING RATE
AND MAGNETO-OPTICAL EFFECT
ON MAGNETO-OPTICAL MULTILAYER FILM WHICH SATISFIES
NONREFLECTIVE CONDITIONS TO SOME DEGREE

RELATION BETWEEN MAGNETIC SUBSTANCE FILLING RATE
AND MAGNETO-OPTICAL EFFECT
ON MAGNETO-OPTICAL MULTILAYER FILM WHICH SATISFIES
PERFECTLY NONREFLECTIVE CONDITIONS

——————— FARADAY ROTATION ANGLE $\theta_F$

-------- TOTAL ROTATION ANGLE $\theta$

MAGNETO-OPTICAL EFFECT ON THE MAGNETO-OPTICAL MEMBER SHOWN IN FIG.15

——— FARADAY ROTATION ANGLE $\theta_F$

------- TOTAL ROTATION ANGLE $\theta$

MAGNETO-OPTICAL EFFECT ON CONVENTIONAL MAGNETO-OPTICAL MEMBER

—— FARADAY ROTATION ANGLE $\theta_F$

------ TOTAL ROTATION ANGLE $\theta$

OPTICAL ISOLATOR WITH A COMPACT DIMENSION

BACKGROUND OF THE INVENTION

1. Field of the Invention

The present invention relates to an optical isolator for use in an optical fiber communication system, an optical measurement system, and the like.

2. Description of the Related Art

In an optical fiber communication system in which a semiconductor laser is employed as a light source, in particular in an optical system which is implemented by high speed digital transmission method or analog direct modulation method, reflection noise which is generated when reflected light from optical connector connection points, optical circuit components and the like employed in the optical fiber circuit is made incident on the semiconductor laser again often causes serious problems in designing system and device. In such cases, for the purpose of removing the reflected light which is made incident on the laser again, an optical isolator is used. The basic function of the optical isolator is to transmit the light emitted from the semiconductor laser (the light source) to a transmission path such as optical fiber through the optical isolator without any losses, and at the same time to cut off the reflected light from the optical fiber and the like in order to prevent it from returning to the semiconductor laser (the light source).

The conventional optical isolator, in general, includes: a polarizer; an analyzer; and a magneto-optical member which has the Faraday effect (the magneto-optical effect) and is provided between the polarizer and the analyzer. The magneto-optical member has been constituted such that magnetic substance and dielectric substance are laminated in the form of thin film with irregular thickness given to each layer; or that two dielectric multilayer films in each of which magnetic substance and dielectric substance are alternately laminated with regular thickness and an irregular lamination portion are formed in the form of thin film. And, for the polarizer and the analyzer, Rochon prism made of calcite, rutile single crystal in the form of wedge, polarizing beam splitter (PBS) or the like has been employed.

Now, since the above-mentioned Rochon prism made of calcite or the rutile single crystal in the form of wedge which is employed as the polarizer and the analyzer uses optical crystal, its external dimension becomes inevitably large. And, for the polarizing beam splitter, dielectric multiplayer film needs to be formed on the slant face of triangular prism in which glass substrate is employed as base material, forcing its external dimension to become large.

SUMMARY OF THE INVENTION

In the light of the foregoing, the present invention was made in order to solve the above-mentioned problems associated with the prior art, and therefore has an object to provide an optical isolator with a compact dimension.

According to one aspect of the present invention, there is provided an optical isolator including: a polarizer for taking out polarizing component from incident light; an analyzer which is used in combination with the polarizer; and a magneto-optical member which is formed in the form of thin film and provided between the polarizer and the analyzer, wherein the polarizer and/or the analyzer are/is composed of magnetic substance cluster thin film and are/is formed integrally with the magneto-optical member.

According to another aspect of the present invention, there is provided an optical isolator according to the first aspect, wherein the magnetic substance cluster thin film is made of cobalt minute particle cluster.

BRIEF DESCRIPTION OF THE DRAWINGS

The above and other objects as well as advantages of the present invention will become clear by the following description of the preferred embodiments of the present invention with reference to the accompanying drawings, wherein.

DETAILED DESCRIPTION OF THE PREFERRED EMBODIMENTS

An optical isolator according to the preferred embodiment of the present invention will hereinafter be described in detail with reference to the accompanying drawings.

Figure 1:
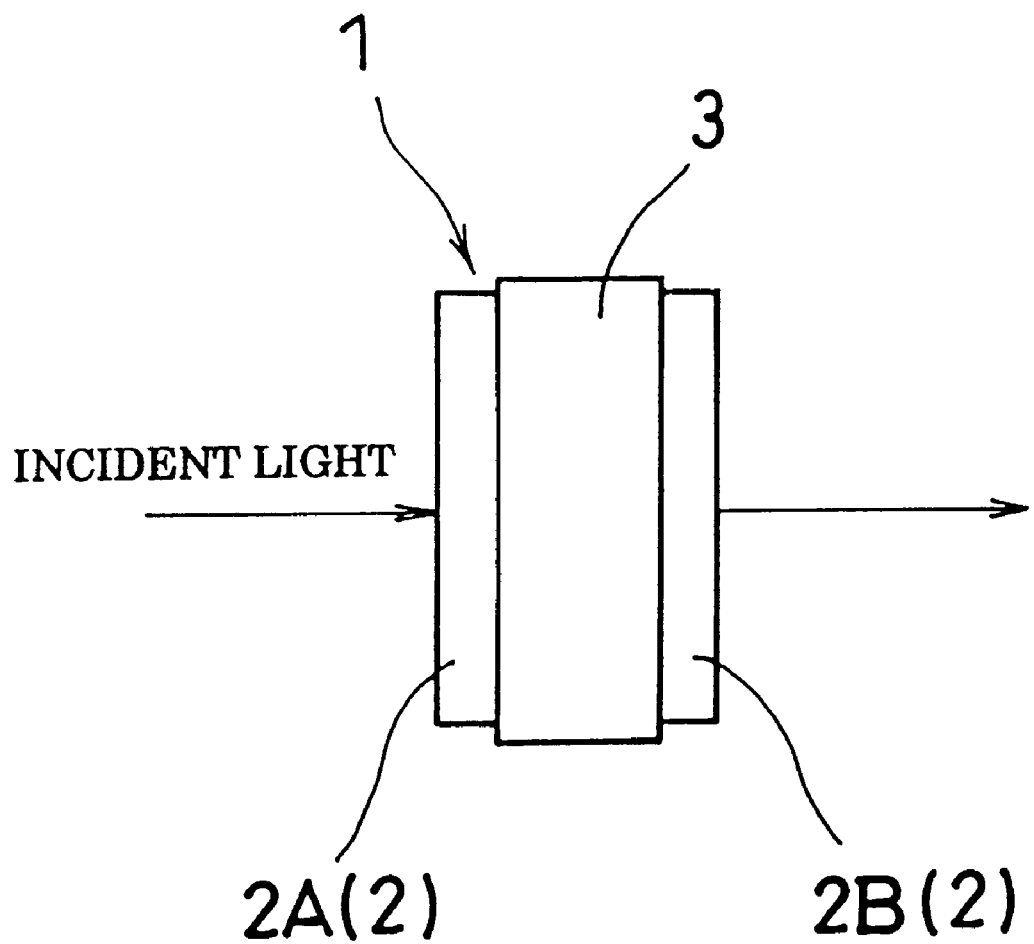
FIG. 1 is a cross sectional view showing the structure of an optical isolator according to an embodiment of the present invention.

As shown in FIG. 1, an optical isolator 1 includes: a polarizer 2A for taking out polarizing component from incident light; an analyzer 2B which is used in combination with the polarizer 2A; and a magneto-optical member 3 which is provided between the polarizer 2A and the analyzer 2B. In this connection, the polarizer 2A, the analyzer 2B and the magnet-optical member 3 are integrated in the form of film. This optical isolator 1 serves to transmit light emitted from a light source such as semiconductor laser to transmission path formed of optical fiber or the like without any losses, and at the same time to cut off reflected light from the transmission path to prevent the reflected light from returning to the light source.

The magneto-optical member 3 is formed in the form of thin film in such a way that magnetic substance layers and dielectric substance layers are laminated with irregular thickness given to each layer thereof.

The polarizer 2A and the analyzer 2B are both formed of a cobalt minute particle cluster thin film 2 (a magnetic substance minute particle cluster thin film). The cobalt minute particle cluster thin film 2 has great polarizing characteristics as will be described later, is formed in the form of tape, film or sheet and is set in such a way as to have a thin thickness.

The optical isolator 1, in which the polarizer 2A and the analyzer 2B are both formed of the cobalt minute particle cluster thin film 2 which is set to have a thin thickness, can be made more compact and lighter as well by having them formed integrally with the magneto-optical member 3 which is formed in the form of thin film. While the isolator of the prior art which employs Rochon prism made of calcite, wedge-shaped rutile single crystal or polarizing beam splitter for both the polarizer and the analyzer inevitably tends to be large in size due to the large dimension of the above mentioned members (Rochon prism, rutile single crystal, polarizing beam splitter), the optical isolator 1 of the present invention can be miniaturized.

In this connection, instead of having both the polarizer 2A and the analyzer 2B formed of the cobalt minute particle cluster thin film 2 as described above, either the polarizer 2A or the analyzer 2B may be formed of the cobalt minute particle cluster thin film 2.

Further, in place of the above-mentioned cobalt minute particle cluster thin film 2, minute particle cluster thin films of other magnetic substances may be employed.

Figure 2:
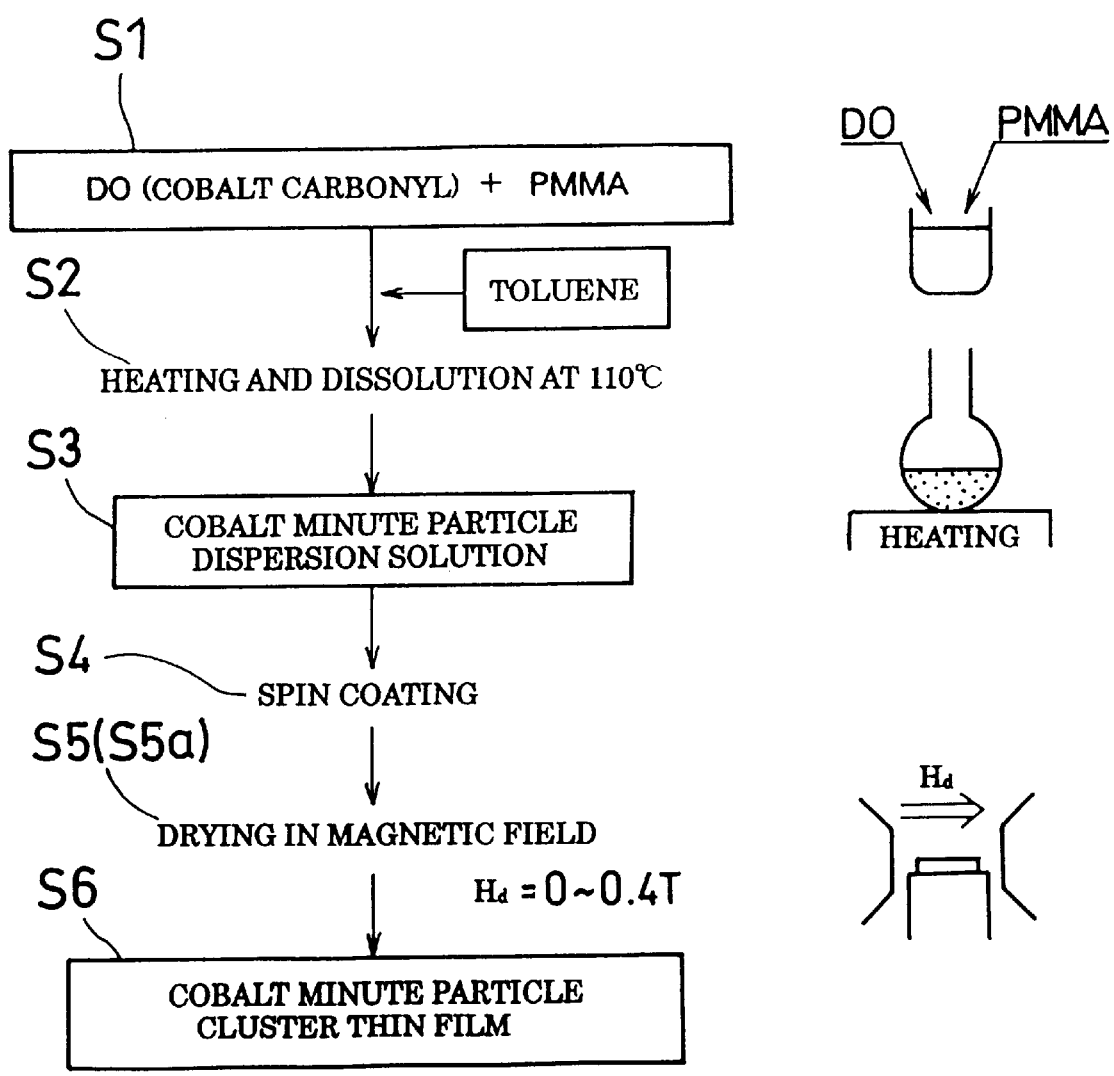
FIG. 2 is a process diagram schematically explaining a method of forming a cobalt minute particle cluster thin film 2 which composes a polarizer and an analyzer.

Now, the forming method and the characteristics of the magnetic substance minute particle cluster thin film of which the polarizer 2A and/or the analyzer 2B are/is formed will hereinbelow be described with reference to FIG. 2 by taking as an example the cobalt minute particle cluster thin film 2, and in addition thereto, the characteristics of the magneto-optical member will hereinbelow be described with reference to FIG. 9.

The method of forming the cobalt minute particle cluster thin film 2 will now be described with reference to FIG. 2.

First, cobalt carbonyl [$Co_2(CO)_8$, which will hereinafter be referred to as "DO", when applicable] and a plastic matrix [polymethyl methacrylate (PMMA): its average degree of polymerization is 6,000] as transparent medium are dissolved in toluene (solvent)(Step S1). Thereafter, the resultant solution is heated for six hours at a temperature of 110° C. while being stirred in nitrogen (inactive gas) atmosphere (Step S2) to obtain fcc cobalt minute particle dispersion solution ("fcc" is shortened from face centered cubic) (Step S3).

Next, the resultant solution is applied onto a glass substrate (a substrate) by utilizing a spin coater (Step S4) and then is solidified by scattering away toluene dried in the atmosphere (Step S5). As a result, a thin film sample with the cobalt minute particles dispersed into PMMA is obtained. By utilizing this method, a light permeable thin film (the cobalt minute particle cluster thin film 2) with a thickness of several $\mu$m to several tens $\mu$m is formed (Step S6). In addition, D.C. magnetic field is applied in parallel to the glass substrate during the solidification (Step S5a) so that a filament-shaped cobalt minute particle cluster 4 which is oriented in the direction of the magnetic field can be formed in the thin film (the cobalt minute particle cluster thin film 2). The shape of the cobalt minute particle cluster 4 can be changed depending on the viscosity of the solution and the concentration of the minute particles.

As a parameter exhibiting the concentration of the cobalt minute particles contained in the film (the cobalt minute particle cluster thin film 2), the following cobalt concentration $C_{CO}$ [cobalt concentration in PMMA] is defined based on the weight ratio of DO to PMMA:

$$C_{CO} = \{W_{DO}/(W_{DO}+W_{PMMA})\} \times 100\%$$

This cobalt concentration $C_{CO}$ is an important parameter which is used to determine the particle diameter of the minute particle (the cobalt particle diameter) and the cobalt particle diameter becomes large when the cobalt concentration $C_{CO}$ is large.

Figure 3A:
FIG. 3 is a view produced on the basis of electron microscopic photographs of a PMMA sample in a prescribed step of the forming method shown in FIG. 2.
Figure 3B:
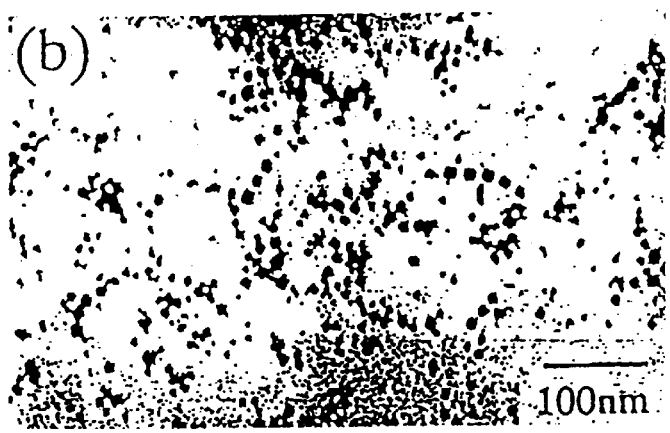
Figure 3C:
Figure 4:
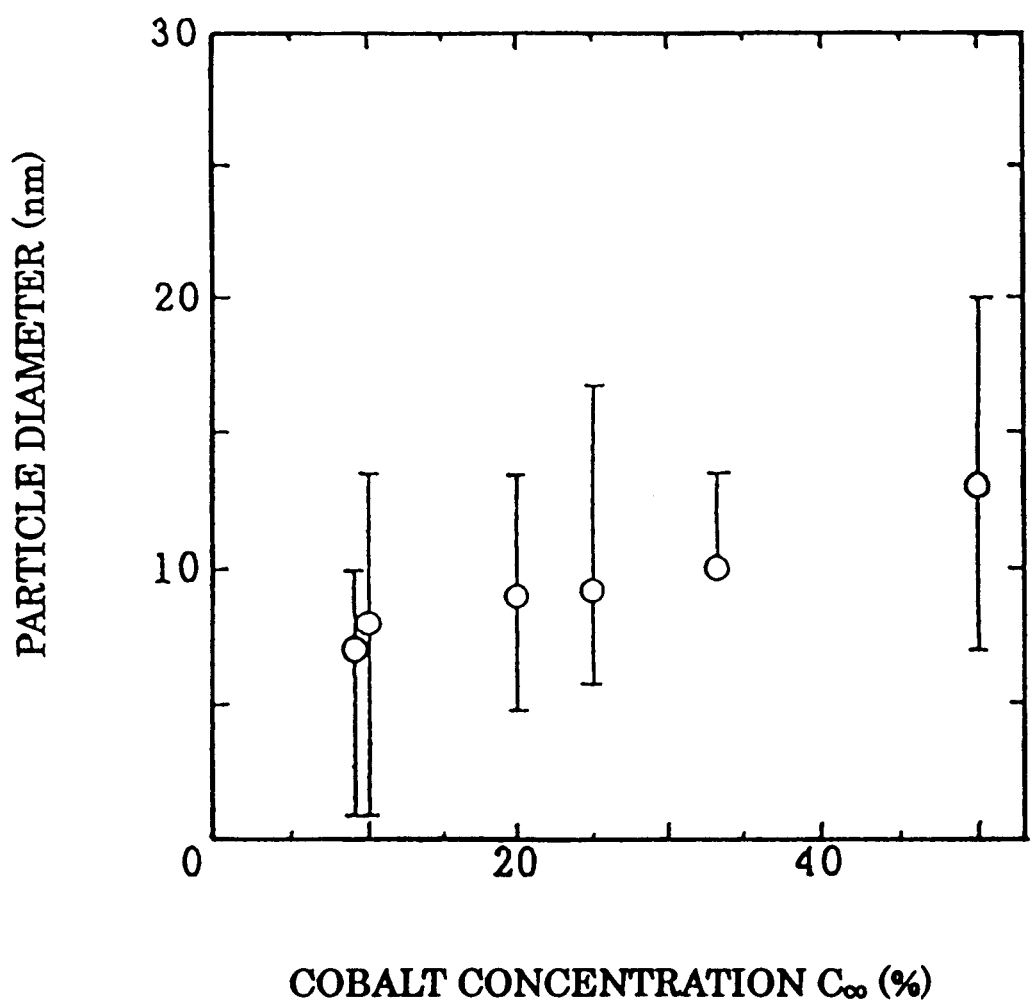
FIG. 4 is a graphical representation showing the change in the particle diameter of each of the minute particles relative to the change in the cobalt concentration.

The minute particles at $C_{CO}=9.1\%$, $C_{CO}=33.3\%$ and $C_{CO}75.0\%$ are as shown in (a), (b) and (c) of FIG. 3 (views which are produced on the basis of the electron microscopic photographs), respectively. And, investigation of change of the particle diameter of the minute particles relative to the cobalt concentration $C_{CO}$ gave the result shown in FIG. 4. From FIGS. 3 and 4, it could be confirmed that the particle diameter of each of the minute particles becomes larger as the cobalt concentration $C_{CO}$ is increased. In addition, it was found out that if the cobalt concentration $C_{CO}$ is 25% or lower, then the nano-minute particles with a particle diameter of 10 nm or smaller are formed.

The thermal and chemical stability of the minute particles which are surrounded by PMMA is very excellent and it was recognized it does not change even if half a year is lapsed after completion of the formation thereof.

Figure 5A:
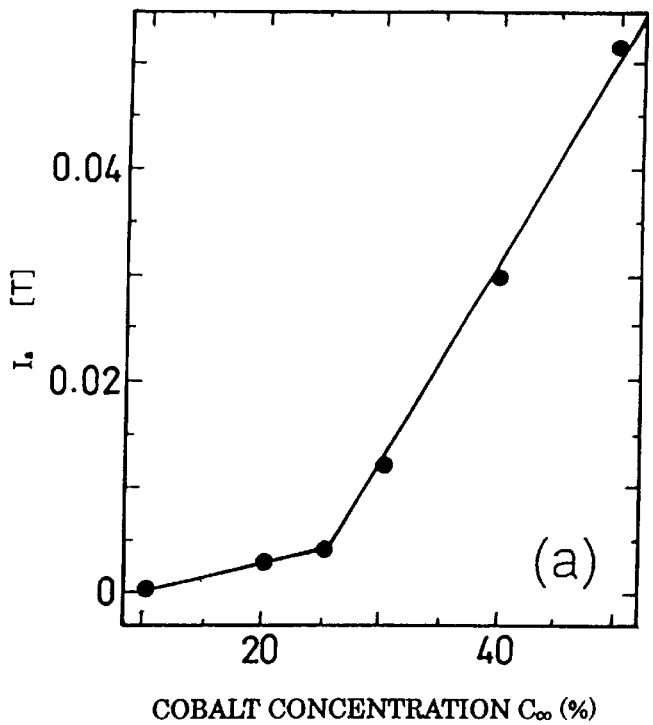
FIG. 5 is a graphical representation showing the magnitude of the saturation magnetization and the coercive force relative to the change in the cobalt concentration.
Figure 5B:
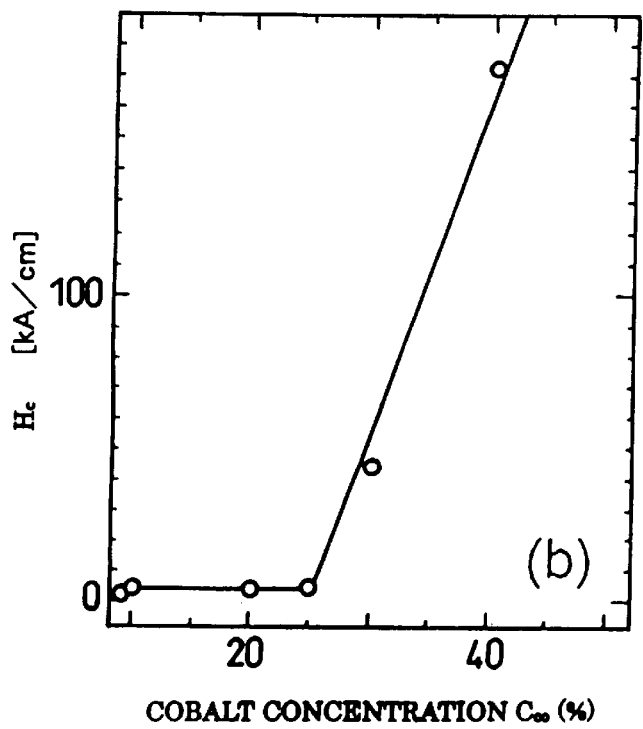

(a) and (b) of FIG. 5 show the change of the magnitudes of the saturation magnetization $I_S$ and the coercive force $H_C$ relative to the cobalt concentration $C_{CO}$, respectively. As apparent from FIG. 5, both the magnitudes of the saturation magnetization $I_S$ and the coercive force $H_C$ show a liner and sharp increase in the region of the cobalt concentration $C_{CO} \geq 25\%$, whereas the coercive force $H_C$ is small and the residual magnetization is substantially zero in the region of the cobalt concentration $C_{CO} \leq 25\%$. This result reflects the change in the particle diameter shown in FIG. 4.

Further, the present inventors define the following $C_{FP}$ as another parameter exhibiting the concentration of the minute particles:

$$C_{FP} = W_{DO}/(W_{DO}+W_{PMMA}+W'_{PMMA})\} \times 100\%$$

where $W'_{PMMA}$ represents PMMA to which solution is added after heat decomposition, and in this case, is a parameter to change the concentration of the minute particles while maintaining the particle diameter constant.

Figure 6:
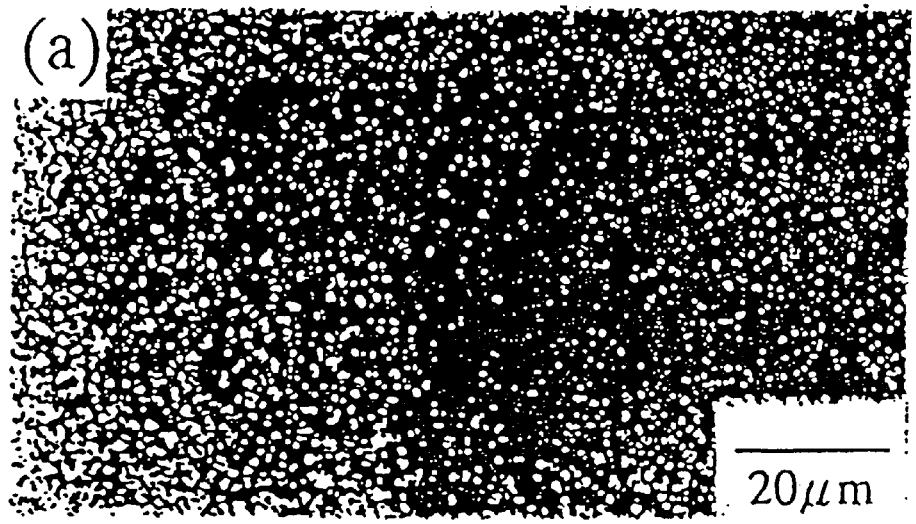
FIG. 6 is a view produced on the basis of electron microscopic photographs of an in-plane orientation film.
Figure 6:
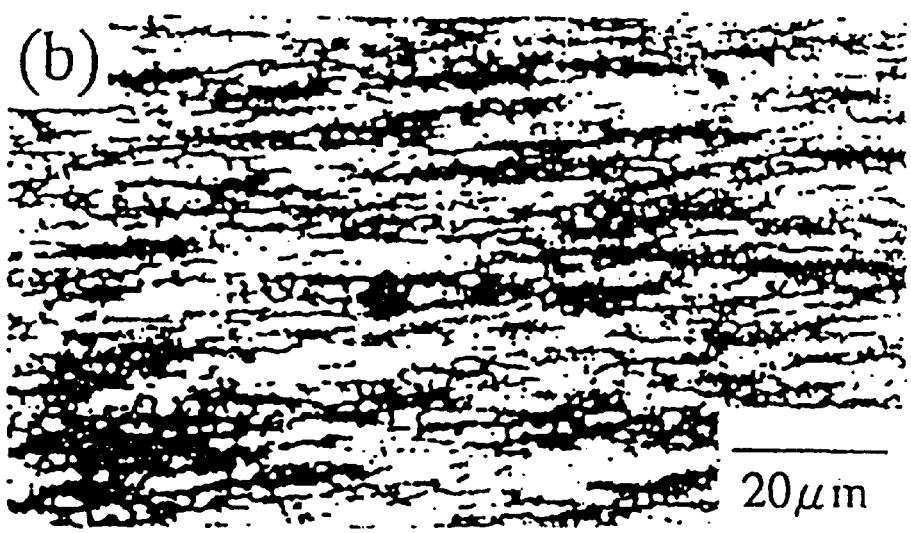
Figure 6:

(a), (b) and (c) of FIG. 6 show views produced on the electron microscopic photographs of the filament-shaped minute particle clusters 4 which are obtained when the applied magnetic field (the magnetic field intensity $H_d$) is applied at $H_d$=0 [kA], 0.16 [kA] and 2.40 [kA], respectively. The sample shown in FIG. 6 was with the cobalt concentration $C_{CO}$=75% diluted to $C_{FP}$=60%.

Figure 7:
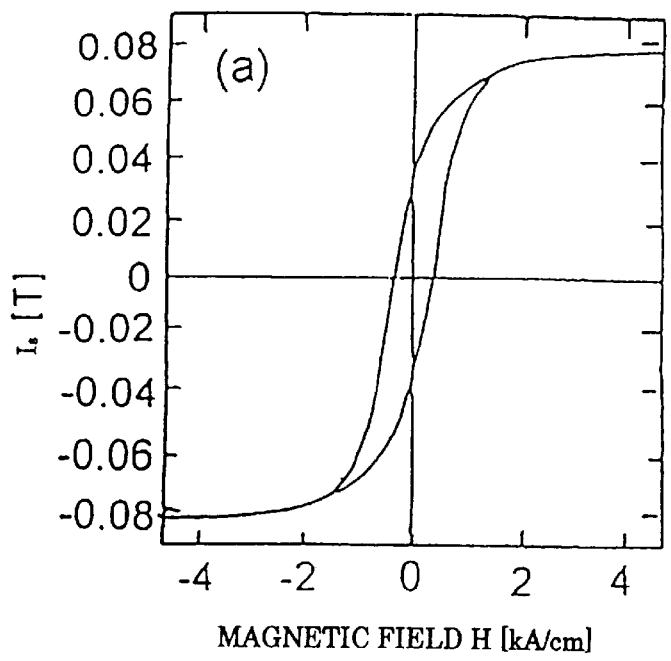
FIG. 7 is a graphical representation showing the magnetization curves of the in-plane orientation film.
Figure 7:
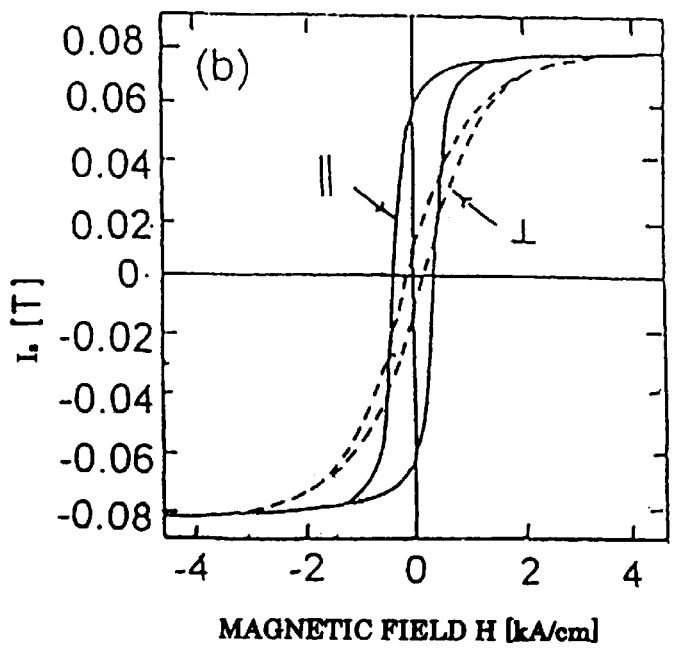
Figure 8:
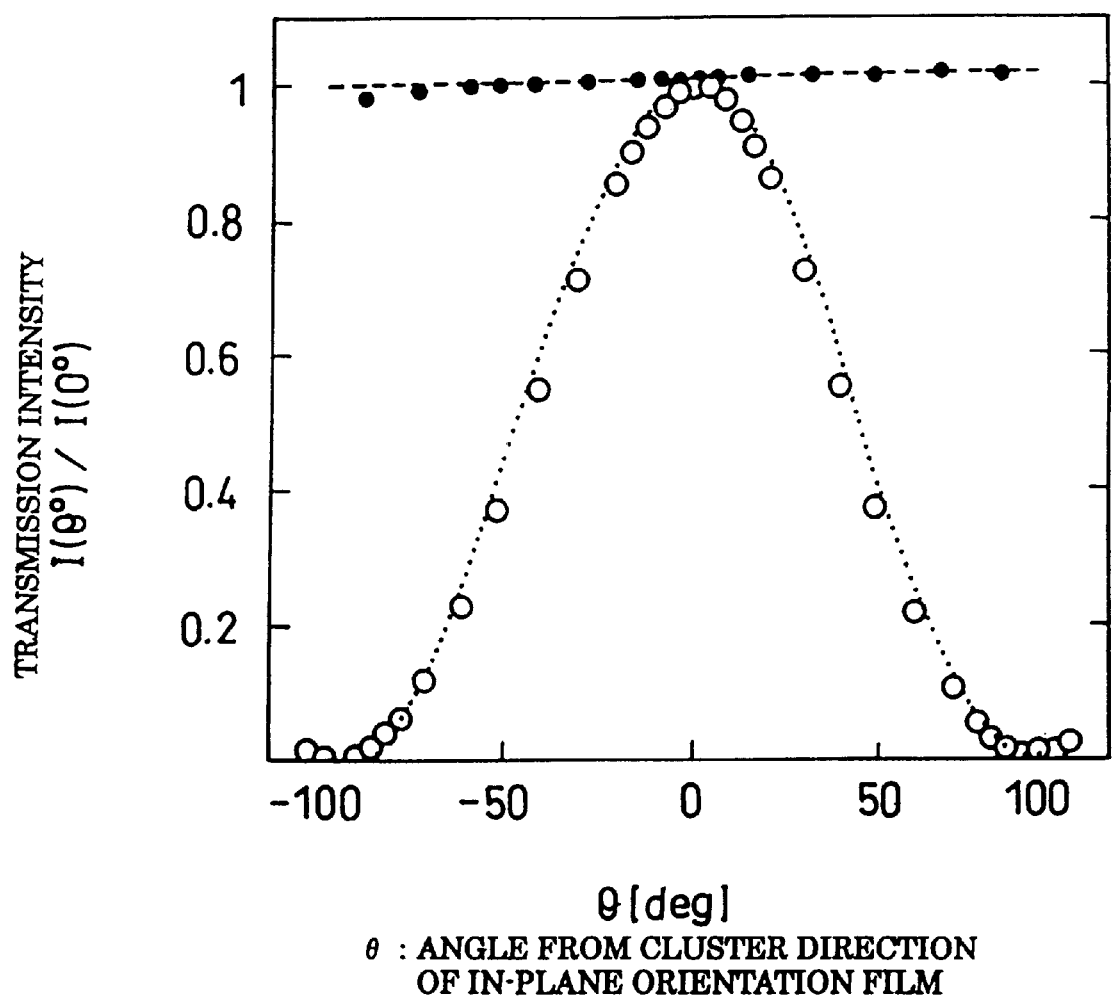
FIG. 8 is a graphical representation showing the transmission intensity characteristics relative to the angle from the cluster direction of the in-plane orientation film.

In the non-orientation sample at $H_d$=0, the cobalt minute particles are uniformly dispersed and hence no characteristic structure is observed. On the other hand, in the case of $H_d \neq 0$ [(b): $H_d$=0.16 [kA] and (c): $H_d$=2.40 [kA]], the linear (filament-shaped) cobalt minute particle cluster 4 can be observed which extends in the direction of the applied magnetic field. That structure of the filament-shaped cluster can be changed depending on the cobalt concentration $C_{CO}$, $C_{FP}$ and $H_d$. In addition, by introducing such a filament-shaped structure, the uniaxial anisotropy occurs in the magnetic characteristics (the magnetization curve in FIG. 7) and the optical transmission characteristics (the characteristics of the transmission intensity to the angle θ from the cluster direction of the in-plane orientation film in FIG. 8) as shown in FIGS. 7 and 8. In FIGS. 7 and 8, samples in which the cobalt concentration $C_{CO}$=75% is diluted to $C_{FP}$=60% were used. In (a) and (b) of FIG. 7, the axis of abscissas represents the magnetic field intensity H [kA/cm] and the axis of ordinates represents the saturation magnetization $I_S$ [T]. In FIG. 8, the axis of abscissas represents the angle θ [degree] from the cluster direction of the in-plane orientation film, and the axis of ordinates represents the transmission intensity I [θ°]/I [0°].

In the above-mentioned embodiment, the magnetic substance minute particles of the magnetic substance minute particle cluster thin film are formed of cobalt as an example, but they can be formed of any other magnetic substance such as Fe, Ni or the like therefor.

Next, the description will hereinbelow be given with respect to the magneto-optical member and the magneto-optical multilayer film of which the magneto-optical member is formed.

Figure 9:
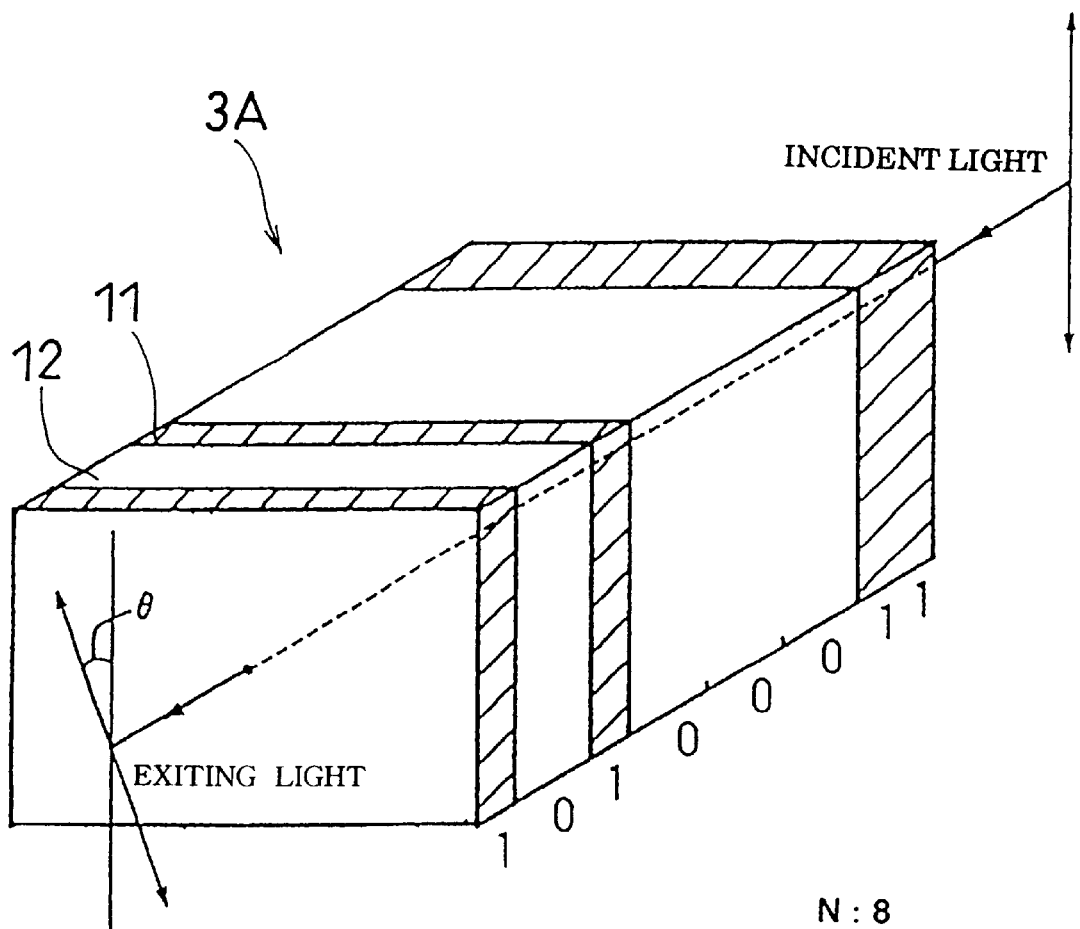
FIG. 9 is a perspective view showing the structure of one example of a magneto-optical multilayer film which is employed for a magneto-optical member shown in FIG. 1.

In FIG. 9, reference symbol 3A designates one example of the magneto-optical multilayer film (the magneto-optical member) for use in the above-mentioned optical isolator 1. In this case, a magnetic substance layer 11 and a dielectric substance layer 12 are alternately laminated to be formed into thin film. The magnetic substance layer 11 and the dielectric substance layer 12 are laminated with irregular thickness given to each layer thereof. Then, light which has been made incident on the magneto-optical multilayer film 3A is propagated in the lamination direction to be emitted therefrom with the plane of polarization rotated by 45 degrees (the total rotation angle is θ).

The parameters which are employed to represent the structure of the magneto-optical multilayer film 3A are the same as those described above.

Then, the bN of the magneto-optical multilayer film 3A shown in FIG. 9 is 10100011 and hence the magneto-optical multilayer film 3A has an irregular periodic structure in thickness of each layer. The results of analyzing theoretically the magneto-optical effect of the magneto-optical multilayer film having such an irregular periodic structure are shown in FIG. 10.

Figure 10:
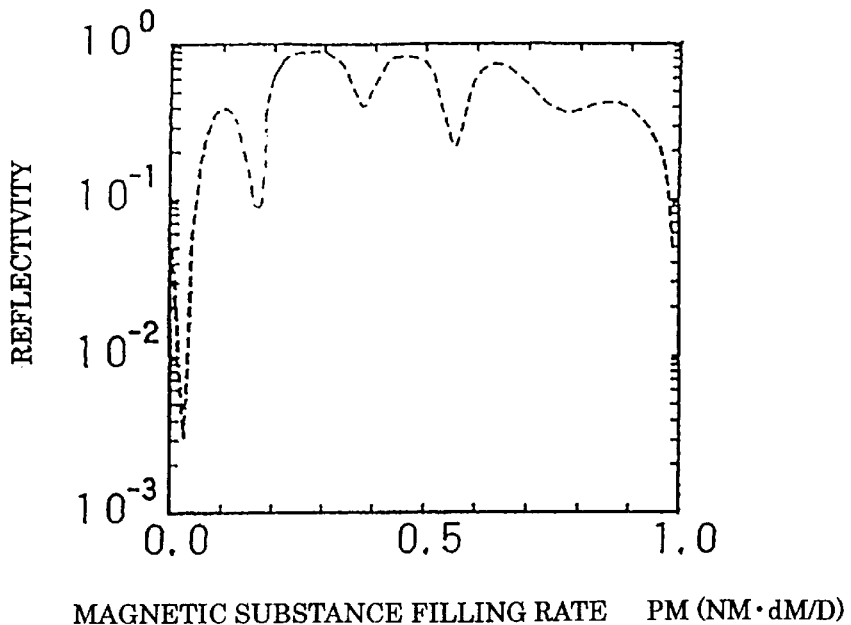
FIG. 10 is a graphical representation showing the reflectivity and the magneto-optical effect relative to the magnetic substance filling rate on the magneto-optical multilayer film shown in FIG. 9.
Figure 10:
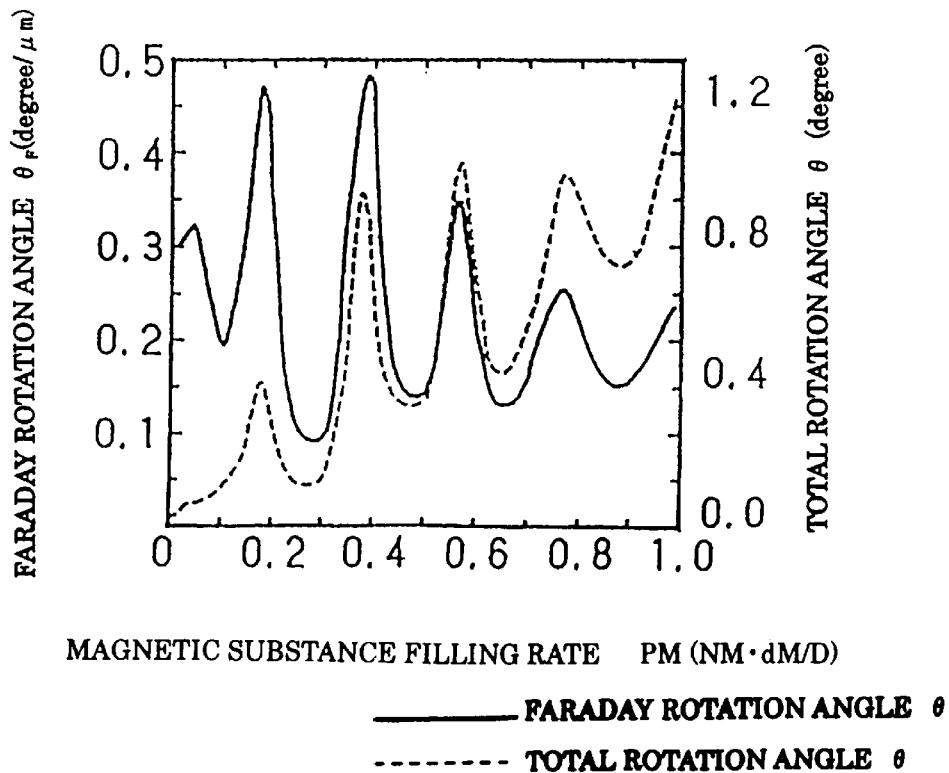

FIG. 10 is a graphical representation showing the reflectance and the magneto-optical effect to the magnetic substance filling rate of the magneto-optical multilayer film having the irregular periodic structure. In (a) of FIG. 10, the axis of abscissas represents the magnetic substance filling rate PM and the axis of ordinates represents the reflectance. And, in (b) of FIG. 10, the axis of abscissas represents the magnetic substance filling rate PM and the axis of ordinates represents the rotation angle (the Faraday rotation angle $\theta_F$) per magnetic substance film thickness and the total rotation angle θ.

In the graph of (b) of FIG. 10, the solid line represents the Faraday rotation angle $\theta_F$ (degrees /μm)=(θ/NM×dM) and the broken line represents the total rotation angle θ (degrees). In this connection, with respect to the analysis, the Maxwell equation is employed as a basic equation of light wave similarly to the above-mentioned method. BiYIG is employed as the magnetic substance, a silicon oxide ($SiO_2$) is employed as the dielectric substance, the total film thickness D is 5 μm, the number N of divisions is 220, and bN is 220 bits, i.e., 10100011110010110101111100011001 01011100110101110001110111101011011011001010100 00011111000111100101111110000001100101010010101 10101101110110101101101110011111010101011010101101 10101101111001110011011011111111111000011011. Under the above conditions, the calculation is carried out. Also, the wavelength of the incident light is 1.15 μm.

It is apparent from the graph of (b) of FIG. 10 that as the magnetic substance filling rate PM increases, the Faraday rotation angle $\theta_F$ has a plurality of peaks. The maximum peak among the plural peaks appears when the magnetic substance filling rate PM is 0.39, and the Faraday rotation angle $\theta_F$ at this time is 0.49 (degrees/μm). The second largest peak appears when the magnetic substance filling rate PM is 0.18, and the Faraday rotation angle $\theta_F$ at this time is 0.48 (degrees/μm). In addition, it is understood that the value of the above-mentioned maximum Faraday rotation angle $\theta_F$ is about 2.5 times as large as the eigenvalue of BiYIG, and that a magnet-optical multilayer film with an irregular periodic structure has a larger enhancement effect of the magneto-optical effect than that with a regular periodic structure. In addition, from (a) of FIG. 10, it is understood that at the magnetic substance filling rate PM at which the Faraday rotation angle $\theta_F$ shows the peak, the reflectance has a reverse peak, and also it is estimated that there is a given correlation between the enhancement effect of the Faraday rotation angle $\theta_F$ and the characteristics in which the reflectance is reduced, i.e., the nonreflective conditions.

Figure 11:
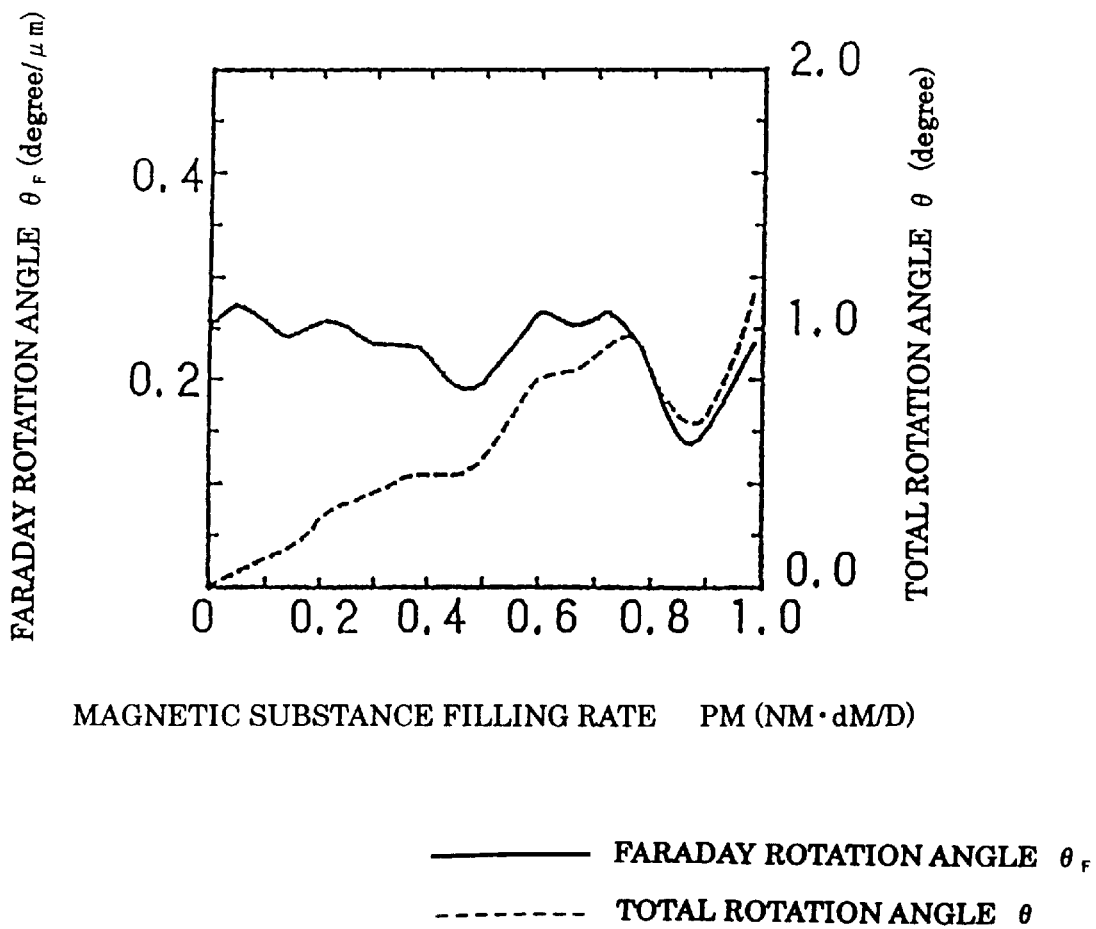
FIG. 11 is a graphical representation showing the relation between the magnetic substance filling rate and the magneto-optical effect on the magneto-optical multilayer film with a structure different from that shown in FIG. 9 which does not satisfy the nonreflective conditions.
Figure 12:
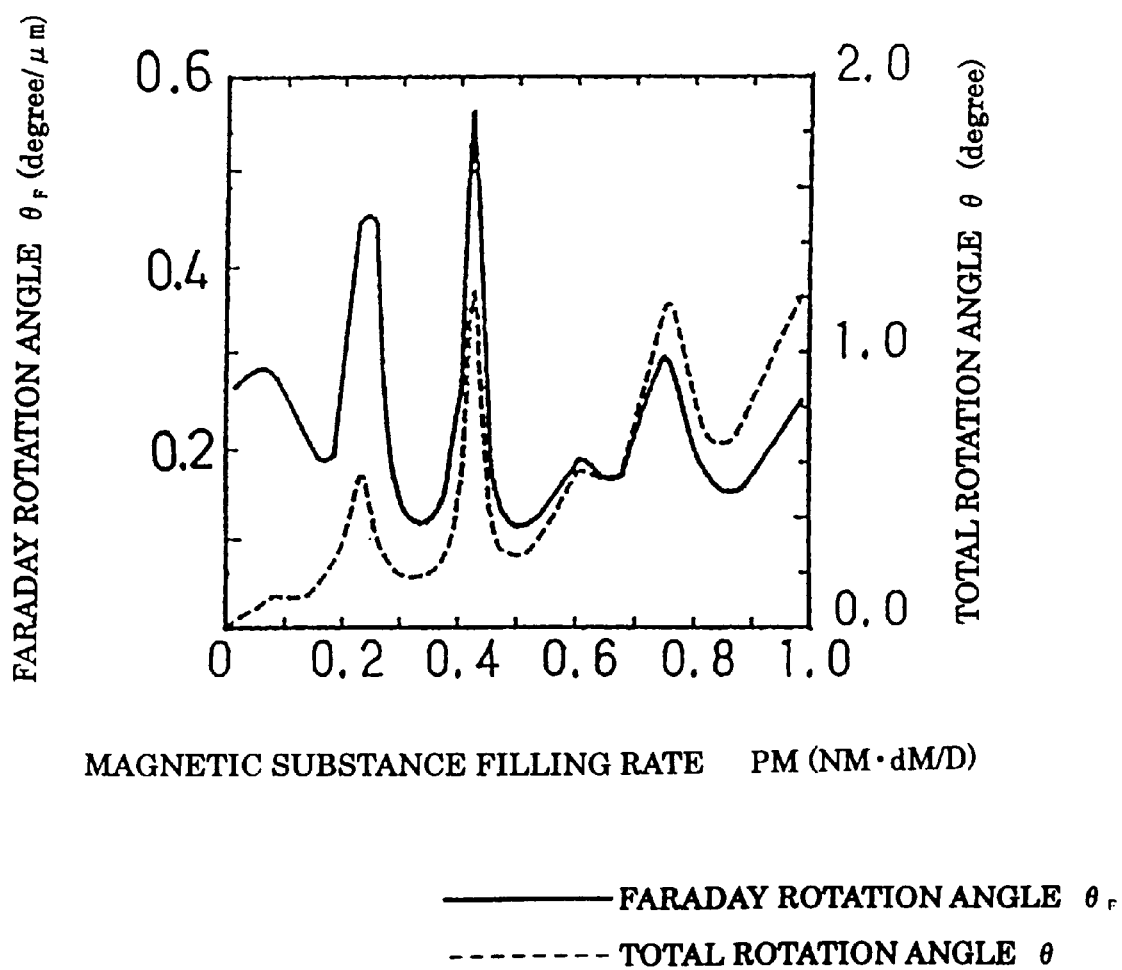
FIG. 12 is a graphical representation showing the relation between the magnetic substance filling rate and the magneto-optical effect on the magneto-optical multilayer film with a structure different from that shown in FIG. 9 which satisfies the nonreflective conditions to some degree.
Figure 13:
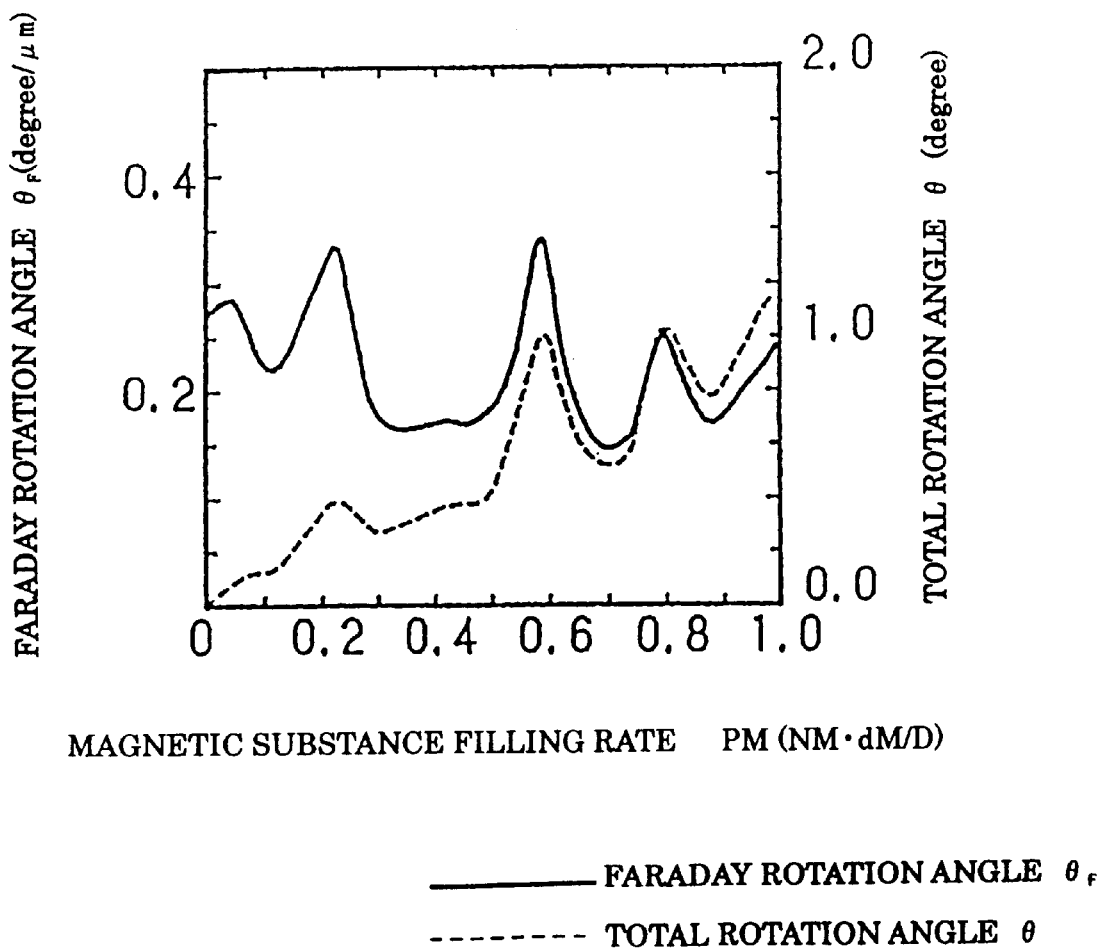
FIG. 13 is a graphical representation showing the relation between the magnetic substance filling rate and the magneto-optical effect on the magneto-optical multilayer film with a structure different from that shown in FIG. 9 which satisfies perfectly the nonreflective conditions.

Next, with respect to the magneto-optical multilayer films having other irregular periodic structures, the magneto-optical effect will hereinbelow be theoretically analyzed similarly to the above-mentioned case. In each of the cases, BiYIG is employed as the magnetic substance, the silicon oxide ($SiO_2$) is employed as the dielectric substance, the total film thickness D is 5 μm, the number N of divisions is 220, and the wavelength of the incident light is 1.15 μm. FIGS. 11 to 13 are graphical representations showing the relation between the magnetic substance filling rate and the magneto-optical effect with respect to three types of magneto-optical multilayer films having respective irregular periodic structures.

FIG. 11 is a graphical representation with respect to the magneto-optical multilayer film which does not satisfy the nonreflective conditions, FIG. 13 is a graphical representation with respect to the magneto-optical multilayer film which perfectly satisfies the nonreflective conditions, and FIG. 12 is a graphical representation with respect to the magneto-optical multilayer film which satisfies the nonreflective conditions to some degree.

As shown in FIGS. 11 to 13, it is understood that the more the magneto-optical multilayer film satisfies the nonreflective conditions, the more remarkable the optical enhancement effect at the specific magnetic substance filling rates PM is. For example, in FIG. 13, when the magnetic substance filling rate PM is 0.41, the Faraday rotation angle $\theta_F$ reaches 0.58 (degrees/$\mu$m) which is about 3 times as large as the eigenvalue of BiYIG.

Figure 14:
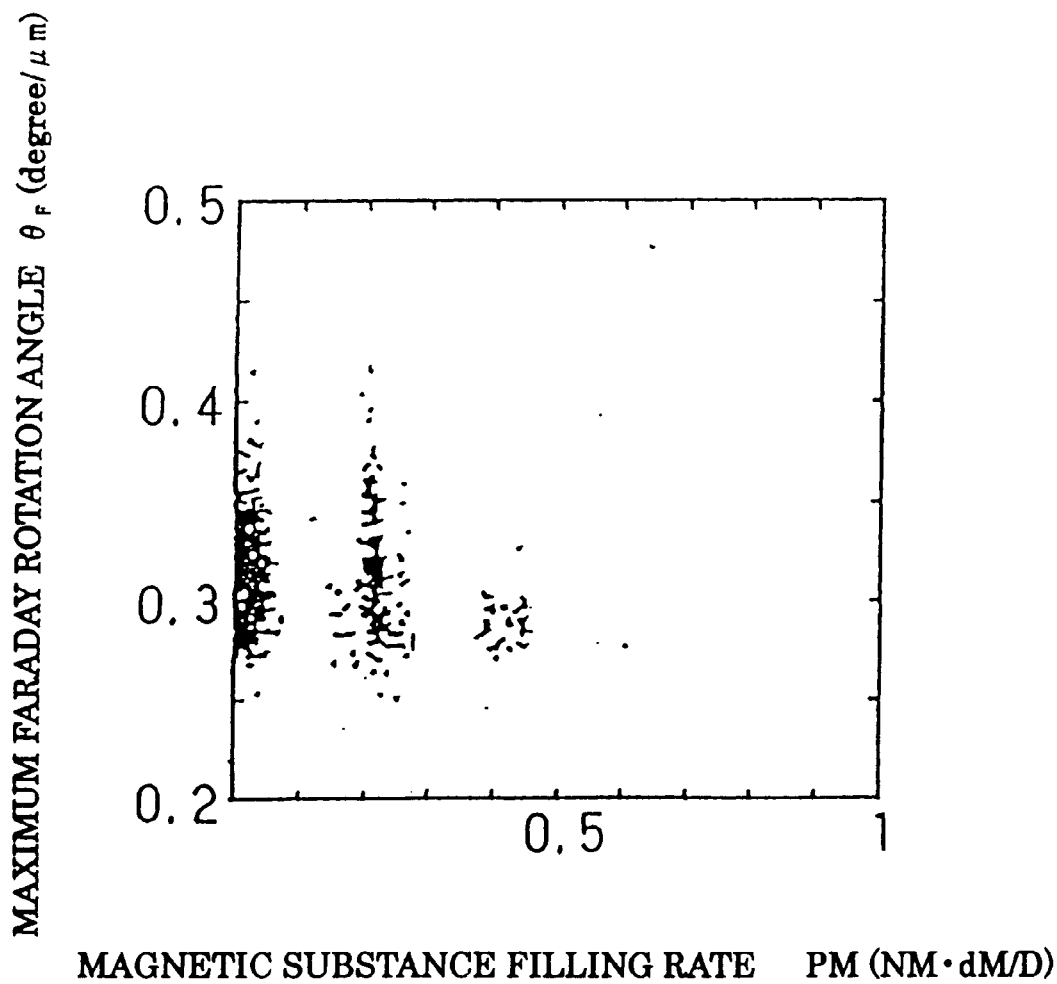
FIG. 14 is a graphical representation showing the relation between the magnetic substance filling rate and the Faraday rotation angle on the magneto-optical multilayer film shown in FIG. 13.

Next, the magnetic substance filling rate PM (corresponding to the ratio of the film thickness of the total magnetic substance to the total film thickness) at which the optical enhancement effect is remarkably shown is examined. With respect to the magneto-optical multilayer films having the irregular periodic structures with 1,000 kinds of bNs, the respective maximum Faraday rotation angles $\theta_F$ and the corresponding magnetic substance filling rates PM are calculated. FIG. 14 is a graphical representation showing the examination results. In FIG. 14, the axis of ordinates represents the maximum Faraday rotation angle $\theta_F$ and the axis of abscissas represents the magnetic substance filling rate PM. Then, it is understood from the graph shown in FIG. 14 that large Faraday rotation angles $\theta_F$ are obtained when the magnetic substance filling rate ranges 10% or smaller, 15% to 30%, or 35% to 50%.

Since the magneto-optical multilayer film (the magneto-optical member) having the irregular periodic structure shows the above-mentioned characteristics shown in FIG. 14, a large Faraday rotation angle $\theta_F$ is obtained by forming the magneto-optical multilayer film having the irregular periodic structure under the condition in which the magnetic substance filling rate PM (the ratio of the film thickness of the total magnetic substance to the total film thickness) is set at 10% or smaller.

In addition, when the magneto-optical multilayer film having the irregular periodic structure is formed under the condition in which the magnetic substance filling rate PM is set at 15% to 30%, a large Faraday rotation angle $\theta_F$ is obtained.

Also, when the magneto-optical multilayer film having the irregular periodic structure is formed under the condition in which the magnetic substance filling rate PM is set at 35% to 50%, a large Faraday rotation angle $\theta_F$ is obtained.

From the above-mentioned results, it is understood that in the magneto-optical multilayer film having the irregular periodic structure, a high optical enhancement effect is obtained at specific ranges of magnetic substance filling rate PM. In addition, it is apparent that the more the irregular periodic structure satisfies the nonreflective condition, the higher the optical enhancement effect is.

Figure 15:
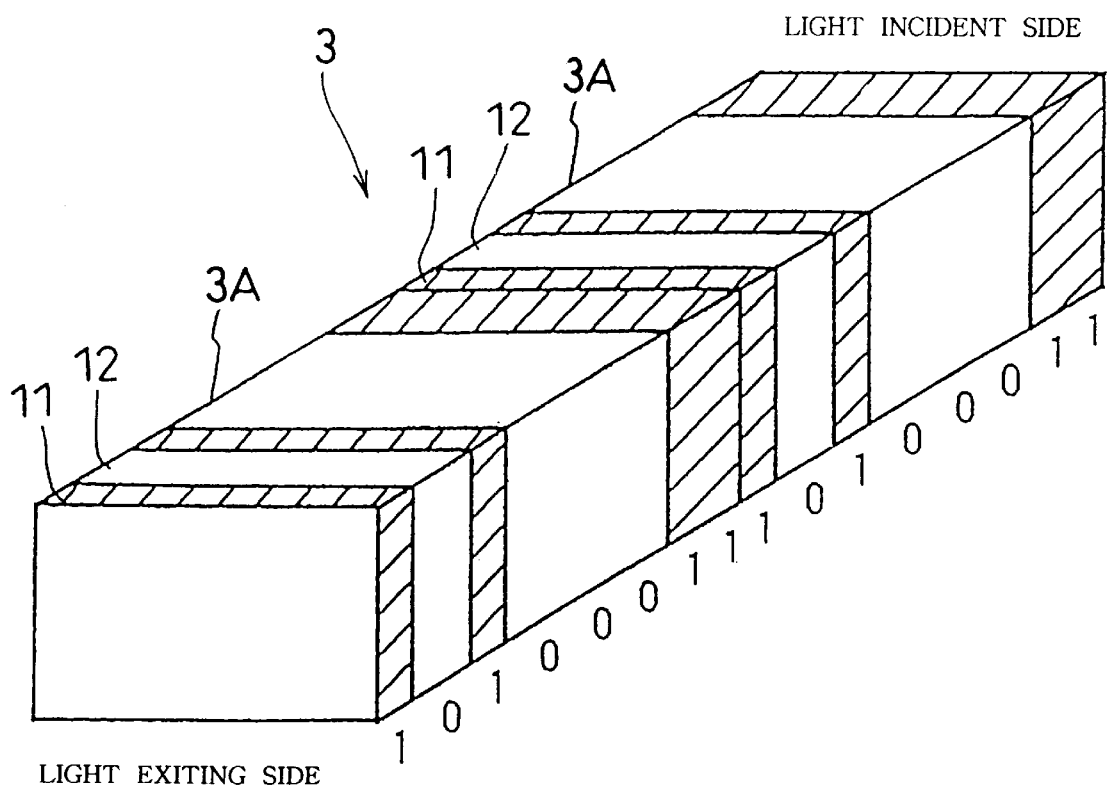
FIG. 15 is a perspective view showing the structure of a magneto-optical member which is constructed by lining up a plurality of magneto-optical multilayer films in the lamination direction.

Further, the magneto-optical effect of what (hereinafter referred to as "a magneto-optical member" to distinguish from a unit of magneto-optical multilayer film) is constructed by lining up plural units of magneto-optical multilayer films (one unit consists of the above mentioned magneto-optical multilayer film, for example, the magneto-optical multilayer film 3A shown in FIG. 9) in the lamination direction is examined. FIG. 15 shows the structure of a magneto-optical member 3 which is constructed by lining up two magneto-optical multilayer films 3A shown in FIG. 9 in the lamination direction. In the figure, a magnetic substance layer 11 on the light exiting side (the left hand) of one magneto-optical multilayer film 3A (the right-hand in FIG. 15) is brought into contact with a magnetic substance layer 11 on the light incident side (the right-hand) of another magneto-optical multilayer film 3A (the left-hand in FIG. 15).

Figure 16:
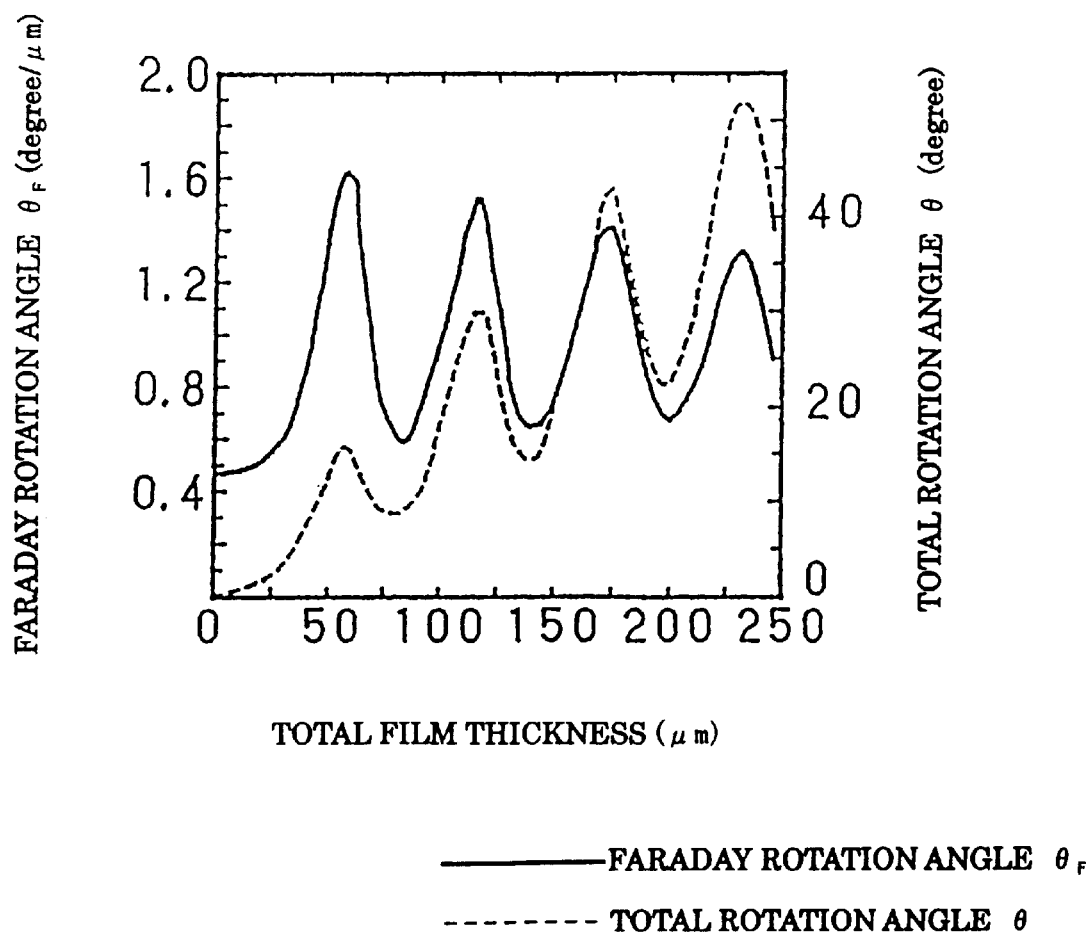
FIG. 16 is a graphical representation showing the magneto-optical effect on the magneto-optical member shown in FIG. 15.
Figure 17:
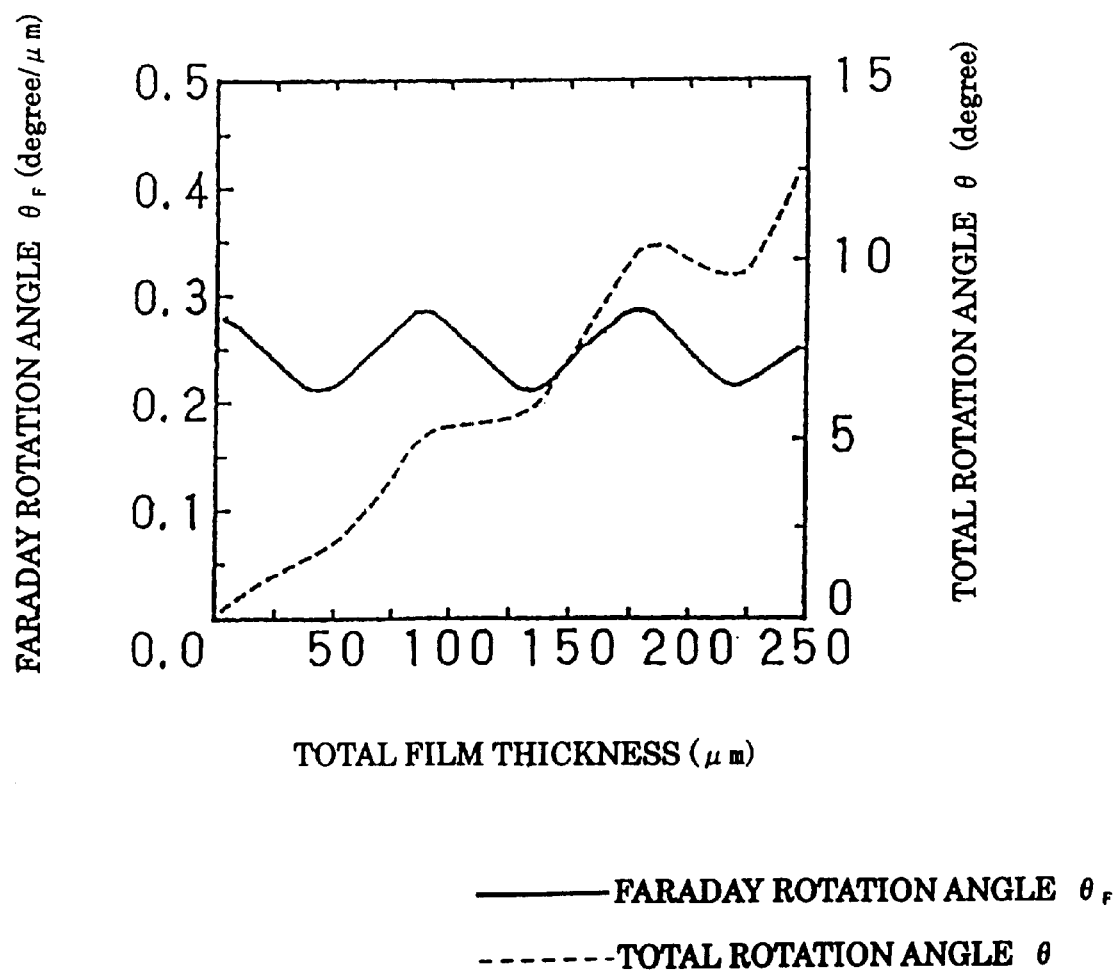
FIG. 17 is a graphical representation showing the magneto-optical effect on one example of a conventional magneto-optical member.

With respect to the magneto-optical member which is constructed by lining up the magneto-optical multilayer films in the lamination direction, the magneto-optical effect is analyzed. FIG. 16 is a graphical representation showing a relation between the total film thickness and the magneto-optical effect with respect to the magneto-optical member which is constructed by lining up in the lamination direction a plurality of magneto-optical multilayer films (each film thickness is 5 $\mu$m and PM is 0.18 $\mu$m) the characteristics of each of which are shown in FIG. 10. In the figure, the axis of ordinates represents the Faraday rotation angle $\theta_F$ and the total rotation angle $\theta$, and the axis of abscissas represents the total film thickness ($\mu$m). In addition, with respect to the conventional magneto-optical member which is constructed by lining up the magneto-optical multilayer films having the regular periodic structure, the same analysis is also carried out. The analysis results are shown in FIG. 17. In the graphs shown in FIGS. 16 and 17, the solid line represents the Faraday rotation angle $\theta_F$ (degrees/$\mu$m) and the broken line represents the total rotation angle $\theta$ (degrees).

As apparent from the comparison of the graph shown in FIG. 16 with the graph shown in FIG. 17, it is understood that as compared with the conventional magneto-optical member having the regular periodic structure (refer to FIG. 17), the magneto-optical member having the irregular periodic structure (i.e., the magneto-optical member as described in the first aspect of the present invention) has a remarkable optical enhancement effect at specific values in the total film thickness (refer to FIG. 16). For example, in the magneto-optical member with a total film thickness of 60 $\mu$m which is constructed by lining up twelve magneto-optical multilayer films having a thickness of 5 $\mu$m in the lamination direction, the Faraday rotation angle $\theta_F$ is 1.60 degrees/$\mu$m which is about 8 times as large as the eigenvalue (0.20 degrees/$\mu$m) of BiYIG.

In addition, in the magneto-optical member having the irregular periodic structure in which the total film thickness is 225 $\mu$m, the total rotation angle is about 53 degrees, and the thickness of the magnetic substance films is 40 $\mu$m out of the total film thickness. In the case where a single layer of BiYIG is used in the optical isolator, a film thickness of 250 $\mu$m is required in order to obtain the rotation of the plane of polarization of 45 degrees which accordingly, in the case of the magneto-optical member having the irregular periodic structure according to the present invention, can be obtained with a thickness of as small as ⅙ of the single magnetic substance layer or smaller. Thus, in the magneto-optical member which is constructed by lining up a plurality of magneto-optical multilayer films having the irregular periodic structure in the lamination direction, a large magneto-optical effect can be obtained, and when the magneto-optical member is used in the optical isolator, the loss due to the light absorption becomes smaller since the film thickness of the magnetic substance layers is small.

In this connection, the magneto-optical member and the method of forming the same are described in detail in Japanese Patent Application No. 283511/1999 which has been proposed by the present inventors.

According to an optical isolator of the first aspect of the present invention, since a polarizer or an analyzer is formed of a magnetic substance minute particle cluster thin film, the thickness of the polarizer or the analyzer can be made small. Also, since the polarizer and the analyzer can be formed on a substrate integrally with a magneto-optical member which is formed into thin film-shape, more compact dimension and lighter weight can be realized as compared with the above-mentioned prior art optical isolator in which the Rochon prism made of calcite, the rutile single crystal having wedge form or the polarizing beam splitter is employed for the polarizer and the analyzer.

While the present invention has been particularly shown and described with reference to the preferred embodiment and the modifications thereof, it will be understood to those skilled in the art that various changes and other modifications will occur without departing from the scope and true spirit of the invention. The scope of the invention is therefore to be determined solely by the appended claims.

What is claimed is:

1. An optical isolator including:

a polarizer for taking out a polarizing component from incident light;

an analyzer which is used in combination with said polarizer; and a magneto-optical member provided between said polarizer and said analyzer, wherein said magneto-optical member is formed in a form of thin film, and wherein either or both of said polarizer and said analyzer are formed of a magnetic substance cluster thin film which is formed such that magnetic substance minute particles are dispersed into a plastic-matrix, and also are formed directly on said magneto-optical member.

2. The optical isolator according to claim 1, wherein said magnetic substance minute particles are cobalt.

3. The optical isolator according to claim 1, wherein said magneto-optical member comprises at least one magnetic substance layer and at least one dielectric substance layer.

4. The optical isolator according to claim 1, wherein both of said polarizer and said analyzer are formed of a magnetic substance cluster thin film which is formed such that magnetic substance minute particles are dispersed into a plastic-matrix, and also are formed directly on said magneto-optical member.

* * * * *